United States Patent
Khosla

(10) Patent No.: US 9,318,105 B1
(45) Date of Patent: Apr. 19, 2016

(54) METHOD, SYSTEM, AND COMPUTER READABLE MEDIUM FOR COMPARING PHONETIC SIMILARITY OF RETURN WORDS TO RESOLVE AMBIGUITIES DURING VOICE RECOGNITION

(71) Applicant: West Interactive Corporation II, Omaha, NE (US)

(72) Inventor: Ashok M. Khosla, Palo Alto, CA (US)

(73) Assignee: West Interactive Corporation II, Omaha, NE (US)

( * ) Notice: Subject to any disclaimer, the term of this patent is extended or adjusted under 35 U.S.C. 154(b) by 0 days.

(21) Appl. No.: 13/927,849

(22) Filed: Jun. 26, 2013

Related U.S. Application Data

(63) Continuation of application No. 10/960,198, filed on Oct. 6, 2004, now Pat. No. 8,494,855.

(51) Int. Cl.
| | |
|---|---|
| *G10L 15/04* | (2013.01) |
| *G10L 15/00* | (2013.01) |
| *G10L 21/00* | (2013.01) |
| *G10L 15/06* | (2013.01) |

(52) U.S. Cl.
CPC ...................................... *G10L 15/06* (2013.01)

(58) Field of Classification Search
USPC .................. 704/231–257, 270–275
See application file for complete search history.

(56) References Cited

U.S. PATENT DOCUMENTS

| | | | |
|---|---|---|---|
| 5,386,494 A * | 1/1995 | White ........................ | 704/270.1 |
| 5,544,049 A * | 8/1996 | Henderson et al. ............... | 704/7 |
| 5,596,634 A | 1/1997 | Fernandez et al. | |
| 6,185,530 B1 * | 2/2001 | Ittycheriah et al. ........... | 704/255 |
| 6,269,335 B1 | 7/2001 | Ittycheriah et al. | |
| 6,269,336 B1 | 7/2001 | Ladd et al. | |
| 6,292,783 B1 | 9/2001 | Rohler et al. | |
| 6,324,513 B1 | 11/2001 | Nagai et al. | |
| 6,567,805 B1 | 5/2003 | Johnson et al. | |
| 6,587,822 B2 * | 7/2003 | Brown et al. .................. | 704/275 |
| 6,754,625 B2 * | 6/2004 | Olsen et al. .................... | 704/235 |
| 6,895,084 B1 | 5/2005 | Saylor et al. | |
| 7,013,276 B2 * | 3/2006 | Bickley et al. ................. | 704/255 |
| 7,089,188 B2 * | 8/2006 | Logan et al. ................... | 704/270 |
| 7,181,387 B2 * | 2/2007 | Ju et al. ............................. | 704/9 |
| 2001/0049688 A1 | 12/2001 | Fratkina et al. | |
| 2002/0138265 A1 * | 9/2002 | Stevens et al. ................ | 704/251 |
| 2002/0154153 A1 | 10/2002 | Messinger et al. | |
| 2002/0188599 A1 | 12/2002 | McGreevy | |
| 2003/0182124 A1 | 9/2003 | Khan | |
| 2004/0083092 A1 | 4/2004 | Valles | |

\* cited by examiner

*Primary Examiner* — Jesse Pullias

(74) *Attorney, Agent, or Firm* — Raffi Gostanian

(57) ABSTRACT

In one embodiment, the invention provides a method for a speech recognition system to select a return value corresponding to a spoken input. The method comprises generating a dictionary comprising return values associated with data provisioned in the speech recognition system; generating a grammar for each return value in the dictionary; analyzing the grammar to determine a subset of return values from the dictionary that are likely alternatives for each return value in the dictionary, based on the grammar; selecting a return value corresponding to the spoken input based on the grammar; and if the selected return value is not confirmed by a user, then presenting the likely alternative for the selected return value to the user.

20 Claims, 31 Drawing Sheets

| Number | Dictionary Entry/Return Value | Grammar/ Synonym |
|---|---|---|
| 1 | A O N Corporation | A O N Corporation, Aon C S G, Aon Corp, Aon Corporation, Aon Insurance, Auto Insurance Specialists, Rish Services |
| 2 | APL Limited | A P L, A P L Limited, A P L Logistics, A P L Logistics Limited, A P L logistic |
| 3 | A P W U Health Plan | A P W U, A P W U Health Plan, American Postal Workers Union, F E H B, F E H B A spoken as word not letters feebaah, Federal Employee Health Benefits Program, Federal Government, Postal Worker |
| 4 | Adolph Coors Company | Adolph Coors Company, Coors, Coors Beer, Coors Brewing Company, Coors Brewing International, Coors Distributing Company, Molson U S |
| 5 | Alliance Data Systems | A D S, Alliance, Alliance Data Systems |
| 6 | Allianz | Allianz, Allianz Life Insurance, Allianz Life Insurance of North America |
| 7 | Amazoncom | Amazon, Amazoncom |

FIG. 1A

| Number | Dictionary Entry/Return Value | Grammar/ Synonym |
|---|---|---|
| 16 | Citizens Banking Corporation | Citizens Bank, Citizens Banking, Citizens Banking Corporation |
| 17 | Combined Specialty Group Inc | Aon C S G, Combined Specialty Group Inc |
| 18 | Comp First | Comp First, Comp first |
| 19 | ConAgra Foods Inc | ConAgra Food, ConAgra Foods, ConAgra Foods Inc, Conagra |
| 20 | Countrywide | CountryWide Credit, Countrywide |
| 21 | Dade Behring | Dade, Dade Behring, Dade Behring Inc, Dade Microsoft |
| 22 | Definity Health | Definity, Definity Health |
| 23 | EntegrisIc | Entegris, EntegrisIc |
| 24 | Franklin Electric | Franklin Electric |
| 25 | Hannaford Bros | Hannaford, Hannaford Bros |
| 26 | J B Hunt | Hunt Trucking, J B Hunt, J B Hunt Transport Services, J B Hunt Trucking, J B Trucking |

FIG. 1C

| Number | Dictionary Entry/Return Value | Grammar/ Synonym |
|---|---|---|
| 30 | Medtronic | Medtronic, Medtronic A V E, Medtronic Corp, Medtronic Corporation, Mini Med |
| 31 | Mitsubishi Polyester Film | Mitsubishi Polyester Film |
| 32 | Nexen Group Inc | Nexen, Nexen Group Inc |
| 33 | Ohio Health | Ohio Group, Ohio Health, Ohio Health Group, Ohio Health Groups, Ohio Health Provider, Ohio Health Providers, Ohio Providers |
| 34 | Oshkosh Truck Co | Medtec, Medtec Ambulance, Oshkosh Truck, Oshkosh Truck Co, Pierce Manufacturing, Pierce MfgFlorida Div |
| 35 | P W Pipe | P W Eagle, P W Pipe |
| 36 | Rayovac Corporation | Rayovac, Rayovac Corp, Rayovac Corporation |
| 37 | Raytheon | Raytheon |
| 38 | Raytheon Retirees | Raytheon Retirees |
| 39 | Ridgeview Medical Center | Chanhassen Clinic, Chaska Medical Center, Mound Clinic, Ridgeview, Ridgeview Clinic, Ridgeview Clinics, Ridgeview Hospital, Ridgeview M C, Ridgeview Medical, Ridgeview Medical Center |

FIG. 1E

| Number | Dictionary Entry/Return Value | Grammar/ Synonym |
|---|---|---|
| 56 | Wise Business Forms | E P X,<br>E P X Group,<br>Next Wave,<br>Wise Business,<br>Wise Business Forms |
| 57 | Wolters Kluwer | Aspen Publishers,<br>Aspen Publishing,<br>B S I,<br>Bankers Systems,<br>C B F Systems,<br>C C H,<br>C C H Computax,<br>C T Corporation,<br>Corporation Trust,<br>K P,<br>KnowledgePoint,<br>Legal Information Services,<br>N I L S Publishing,<br>Tax Compliance,<br>Uniform Information Services,<br>W K U S,<br>W K U S Corp,<br>Wolters Kluwer,<br>Wolters Kluwer U S Corporation,<br>dTech |
| 58 | Woodward | Woodward,<br>Woodward Gov,<br>Woodward Governor,<br>Woodward Industrial |

FIG. 1I

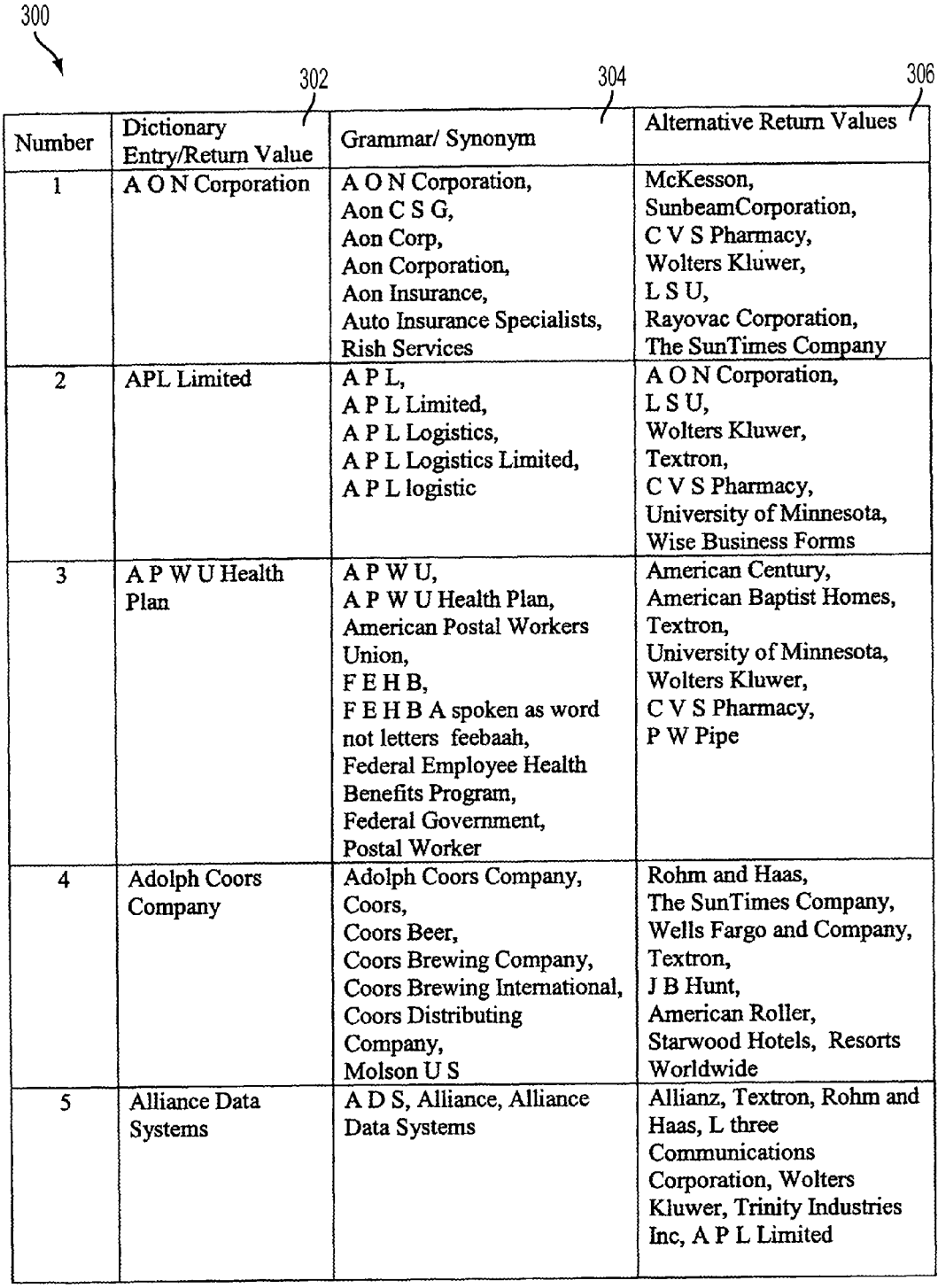

| Number | Dictionary Entry/Return Value | Grammar/ Synonym | Alternative Return Values |
|---|---|---|---|
| 1 | A O N Corporation | A O N Corporation, Aon C S G, Aon Corp, Aon Corporation, Aon Insurance, Auto Insurance Specialists, Rish Services | McKesson, SunbeamCorporation, C V S Pharmacy, Wolters Kluwer, L S U, Rayovac Corporation, The SunTimes Company |
| 2 | APL Limited | A P L, A P L Limited, A P L Logistics, A P L Logistics Limited, A P L logistic | A O N Corporation, L S U, Wolters Kluwer, Textron, C V S Pharmacy, University of Minnesota, Wise Business Forms |
| 3 | A P W U Health Plan | A P W U, A P W U Health Plan, American Postal Workers Union, F E H B, F E H B A spoken as word not letters feebaah, Federal Employee Health Benefits Program, Federal Government, Postal Worker | American Century, American Baptist Homes, Textron, University of Minnesota, Wolters Kluwer, C V S Pharmacy, P W Pipe |
| 4 | Adolph Coors Company | Adolph Coors Company, Coors, Coors Beer, Coors Brewing Company, Coors Brewing International, Coors Distributing Company, Molson U S | Rohm and Haas, The SunTimes Company, Wells Fargo and Company, Textron, J B Hunt, American Roller, Starwood Hotels, Resorts Worldwide |
| 5 | Alliance Data Systems | A D S, Alliance, Alliance Data Systems | Allianz, Textron, Rohm and Haas, L three Communications Corporation, Wolters Kluwer, Trinity Industries Inc, A P L Limited |

| Number | Dictionary Entry/Return Value | Grammar/ Synonym | Alternative Return Values |
|---|---|---|---|
| 6 | Allianz | Allianz, Allianz Life Insurance, Allianz Life Insurance of North America | Alliance Data Systems, Textron, Rohm and Haas, L three Communications Corporation, A O N Corporation, Wolters Kluwer, Utica National Insurance |
| 7 | Amazoncom | Amazon, Amazoncom | L three Communications Corporation, American Baptist Homes, Alliance Data Systems, McKesson, Avalon Correctional Services Inc, Textron, Hannaford Bros |
| 8 | American Baptist Homes | A B H M, American Baptist, American Baptist Home, American Baptist Homes, American Baptist Homes of the Midwest, American Homes | American Century, A P W U Health Plan, American Roller, The SunTimes Company, Wolters Kluwer, McKesson, A P L Limited |
| 9 | American Century | American Century, American Century, Services Corporation | A P W U Health Plan, L three Communications Corporation, American Baptist Homes, American Roller, Wolters Kluwer, Adolph Coors Company, C V S Pharmacy |
| 10 | American Roller | American Roller, American Roller Company, L L C | L S U, American Baptist Homes, Textron, American Century, Wise Business Forms, Adolph Coors Company, McKesson |

FIG. 3B

| Number | Dictionary Entry/Return Value | Grammar/ Synonym | Alternative Return Values |
|---|---|---|---|
| 11 | Avalon Correctional Services Inc | Avalon, Avalon Correctional Facilities, Avalon Correctional Services, Avalon Correctional Services Inc | A O N Corporation, McKesson, Wolters Kluwer, L three Communications Corporation, Utica National Insurance, J B Hunt, Textron |
| 12 | Budget | Budget, Budget Group Inc, Budget Rent A Car, Budget Rental | Nexen Group Inc, Textron, P W Pipe, Trinity Industries Inc, C V S Pharmacy, L S U, Wolters Kluwer |
| 13 | Butler Manufacturing Company | Butler, Butler Manufacturing, Butler Manufacturing, Company | Oshkosh Truck Co, Textron, L three Communications Corporation, Charter Communications, Rohm and Haas, L S U, The SunTimes Company |
| 14 | C V S Pharmacy | C V S, C V S Corporation, C V S Pharmacy | McKesson, Wolters Kluwer, Medtronic, Textron, A O N Corporation, Rayovac Corporation, Sunbeam Corporation |
| 15 | Charter Communications | Charter, Charter Communication, Charter Communications, Charter Communications, International | L three Communications Corporation, Oshkosh Truck Co, J B Hunt, The SunTimes Company, Butler Manufacturing Company, Rohm and Haas, Alliance Data Systems |

| Number | Dictionary Entry/Return Value | Grammar/ Synonym | Alternative Return Values |
|---|---|---|---|
| 16 | Citizens Banking Corporation | Citizens Bank, Citizens Banking, Citizens Banking Corporation | Wolters Kluwer, The SunTimes Company, A O N Corporation, Utica National Insurance, McKesson, L S U, L three Communications Corporation |
| 17 | Combined Specialty Group Inc | Aon C S G, Combined Specialty Group Inc | Textron, A O N Corporation, Hannaford Bros, Ridgeview Medical Center, The SunTimes Company, A P L Limited, Stanford University |
| 18 | Comp First | Comp First, Comp first | Wise Business Forms, Wolters Kluwer, J B Hunt, Textron, SuperValu, C V S Pharmacy, Countrywide |
| 19 | ConAgra Foods Inc | ConAgra Food, ConAgra Foods, ConAgra Foods Inc, Conagra | Textron, SuperValu, Wolters Kluwer, Stanford University, Adolph Coors Company, Countrywide, C V S Pharmacy |
| 20 | Countrywide | CountryWide Credit, Countrywide | Ridgeview Medical Center, ConAgra Foods Inc, C V S Pharmacy, Wolters Kluwer, Comp First, L S U, Textro |

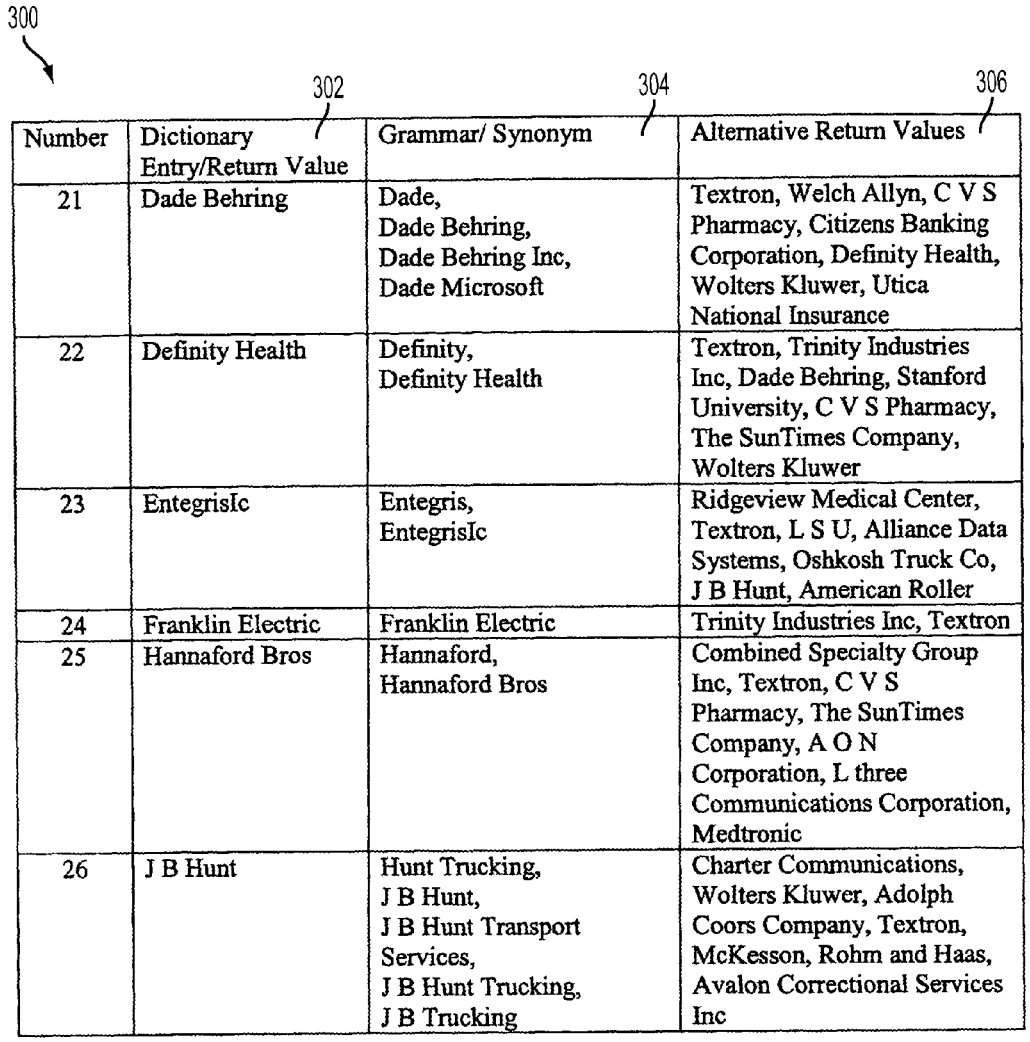

| Number | Dictionary Entry/Return Value | Grammar/ Synonym | Alternative Return Values |
|---|---|---|---|
| 21 | Dade Behring | Dade, Dade Behring, Dade Behring Inc, Dade Microsoft | Textron, Welch Allyn, C V S Pharmacy, Citizens Banking Corporation, Definity Health, Wolters Kluwer, Utica National Insurance |
| 22 | Definity Health | Definity, Definity Health | Textron, Trinity Industries Inc, Dade Behring, Stanford University, C V S Pharmacy, The SunTimes Company, Wolters Kluwer |
| 23 | EntegrisIc | Entegris, EntegrisIc | Ridgeview Medical Center, Textron, L S U, Alliance Data Systems, Oshkosh Truck Co, J B Hunt, American Roller |
| 24 | Franklin Electric | Franklin Electric | Trinity Industries Inc, Textron |
| 25 | Hannaford Bros | Hannaford, Hannaford Bros | Combined Specialty Group Inc, Textron, C V S Pharmacy, The SunTimes Company, A O N Corporation, L three Communications Corporation, Medtronic |
| 26 | J B Hunt | Hunt Trucking, J B Hunt, J B Hunt Transport Services, J B Hunt Trucking, J B Trucking | Charter Communications, Wolters Kluwer, Adolph Coors Company, Textron, McKesson, Rohm and Haas, Avalon Correctional Services Inc |

FIG. 3E

| Number | Dictionary Entry/Return Value | Grammar/ Synonym | Alternative Return Values |
|---|---|---|---|
| 27 | L S U | Chabert Medical Center, Charity Hospital, Conway Medical Center, E K Long Medical Center, H P Long Medical Center, Health Science Center, Kemp Regional Medical Center, L S U Louisanna State University, Moss Regional Hospital, Pennington Research, University Hospital, University Medical Center, University of New Orleans, WashingtonSt Tammany Regional Center | Ridgeview Medical Center, University of Minnesota, A O N Corporation, C V S Pharmacy, Wolters Kluwer, Stanford University, Textron |
| 28 | L three Communications Corporation | A I S, Aircraft Integration Systems, L three, L three Communications, L three Communications Corporation, Spin of Raytheon | Charter Communications, American Century, Textron, Wolters Kluwer, Alliance Data Systems, Butler Manufacturing Company, Avalon Correctional Services Inc |

FIG. 3F

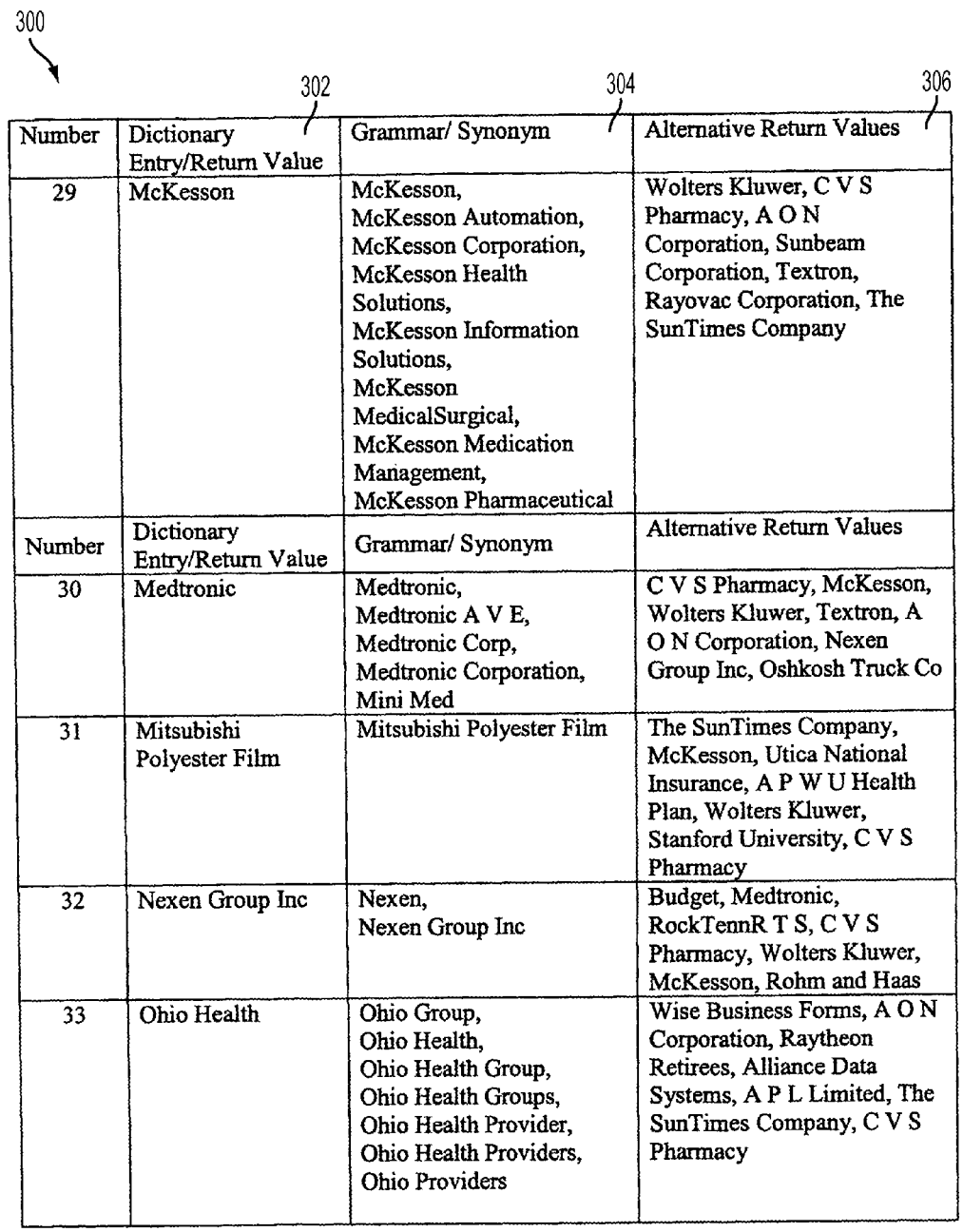

| Number | Dictionary Entry/Return Value | Grammar/ Synonym | Alternative Return Values |
|---|---|---|---|
| 29 | McKesson | McKesson, McKesson Automation, McKesson Corporation, McKesson Health Solutions, McKesson Information Solutions, McKesson MedicalSurgical, McKesson Medication Management, McKesson Pharmaceutical | Wolters Kluwer, C V S Pharmacy, A O N Corporation, Sunbeam Corporation, Textron, Rayovac Corporation, The SunTimes Company |
| Number | Dictionary Entry/Return Value | Grammar/ Synonym | Alternative Return Values |
| 30 | Medtronic | Medtronic, Medtronic A V E, Medtronic Corp, Medtronic Corporation, Mini Med | C V S Pharmacy, McKesson, Wolters Kluwer, Textron, A O N Corporation, Nexen Group Inc, Oshkosh Truck Co |
| 31 | Mitsubishi Polyester Film | Mitsubishi Polyester Film | The SunTimes Company, McKesson, Utica National Insurance, A P W U Health Plan, Wolters Kluwer, Stanford University, C V S Pharmacy |
| 32 | Nexen Group Inc | Nexen, Nexen Group Inc | Budget, Medtronic, RockTennR T S, C V S Pharmacy, Wolters Kluwer, McKesson, Rohm and Haas |
| 33 | Ohio Health | Ohio Group, Ohio Health, Ohio Health Group, Ohio Health Groups, Ohio Health Provider, Ohio Health Providers, Ohio Providers | Wise Business Forms, A O N Corporation, Raytheon Retirees, Alliance Data Systems, A P L Limited, The SunTimes Company, C V S Pharmacy |

FIG. 3G

| Number | Dictionary Entry/Return Value | Grammar/ Synonym | Alternative Return Values |
|---|---|---|---|
| 34 | Oshkosh Truck Co | Medtec, Medtec Ambulance, Oshkosh Truck, Oshkosh Truck Co, Pierce Manufacturing, Pierce MfgFlorida Div | Butler Manufacturing Company, Wolters Kluwer, Charter Communications, Medtronic, Utica National Insurance, C V S Pharmacy, Textron |
| 35 | P W Pipe | P W Eagle, P W Pipe | Textron, Wolters Kluwer, A P W U Health Plan, Budget, Utica National Insurance, C V S Pharmacy, Ridgeview Medical Center |
| 36 | Rayovac Corporation | Rayovac, Rayovac Corp, Rayovac Corporation | C V S Pharmacy, A O N Corporation, Wolters Kluwer, Sunbeam Corporation, McKesson, Textron, Medtronic |
| 37 | Raytheon | Raytheon | Varian Inc, Textron, Nexen Group Inc, Sunbeam Corporation |
| 38 | Raytheon Retirees | Raytheon Retirees | RockTennR T S, Textron, Ohio Health, Adolph Coors Company, C V S Pharmacy, Wolters Kluwer, Ridgeview Medical Center |
| 39 | Ridgeview Medical Center | Chanhassen Clinic, Chaska Medical Center, Mound Clinic, Ridgeview, Ridgeview Clinic, Ridgeview Clinics, Ridgeview Hospital, Ridgeview M C, Ridgeview Medical, Ridgeview Medical Center | L S U, Textron, EntegrisIc, C V S Pharmacy, McKesson, University of Minnesota, A O N Corporation |

| Number | Dictionary Entry/Return Value | Grammar/ Synonym | Alternative Return Values |
|---|---|---|---|
| 45. | Sunbeam Corporation | Coleman, Sunbeam, Sunbeam Corporation | A O N Corporation, McKesson, C V S Pharmacy, Wolters Kluwer, Rayovac Corporation, Textron, Rohm and Haas |
| 46 | SuperValu | Inc Scots Foods, SuperValu, SuperValu Foods | C V S Pharmacy, Stanford University, Textron, Wasserstrom Holdings Inc, Wolters Kluwer, The SunTimes Company, A O N Corporation |
| 47 | Textron | Aerospace Fasteners, Alliance, Amsco, Asset Control, Automotive Solutions, Avdel, Avdel Cherry, Bates, Bell, Bell Helicopter, Burkland, C W C, Cadilac Gage, Camcar, Cessna, Cessna Finance, Cessna Single Engine, Commercial Solutions, Compact, David Brown, | C V S Pharmacy, Wolters Kluwer, P W Pipe, McKesson, L three Communications Corporation, Ridgeview Medical Center, A O N Corporation |
| 48 | The SunTimes Company | Beacon NewsAurora, Beacon, Daily Southtown, Fox Valley Publications, Fox Valley Shopping News, Hollinger International, Jerusalem Post, Midwest Suburban Publishing, Pennysaver Publications, Pioneer Press, Reach Chicago, Sun Publishing Naperville Sun, The Courier News Elgin Courier, The Doings, The Heralds NewsJoliet Herald, The News SunWaukegan Sun, The Star, The SunTimes Company | A O N Corporation, McKesson, L S U, Adolph Coors Company, Textron, Citizens Banking Corporation, C V S Pharmacy |

FIG. 3J

| Number | Dictionary Entry/Return Value | Grammar/ Synonym | Alternative Return Values |
|---|---|---|---|
| 54 | Welch Allyn | Inc, Welch Allyn | Wasserstrom Holdings Inc, Dade Behring, C V S Pharmacy, Textron, Wolters Kluwer, SuperValu, L S U |
| 55 | Wells Fargo and Company | Accordia, Wells, Wells Fargo, Wells Fargo Bank, Wells Fargo Banking, Wells Fargo Banks, Wells Fargo Mortgage, Wells Fargo and Company | C V S Pharmacy, Adolph Coors Company, Textron, Wolters Kluwer, L S U, The SunTimes Company, L three Communications Corporation |
| 56 | Wise Business Forms | E P X, E P X Group, Next Wave, Wise Business, Wise Business Forms | Ohio Health, Wolters Kluwer, American Roller, A P L Limited, Textron, C V S Pharmacy, L S U |
| 57 | Wolters Kluwer | Aspen Publishers, Aspen Publishing, B S I, Bankers Systems, C B F Systems, C C H, C C H Computax, C T Corporation, Corporation Trust, K P, KnowledgePoint, Legal Information Services, N I L S Publishing, Tax Compliance, Uniform Information Services, W K U S, W K U S Corp, Wolters Kluwer, Wolters Kluwer U S Corporation, DTech | McKesson, C V S Pharmacy, Textron, A O N Corporation, Sunbeam Corporation, Rayovac Corporation, Citizens Banking Corporation |

FIG. 3L

|    | aa | ae | ah | ao | aw | ax | ay | b  | ch | d  | dh | eh | er | ey | f  | g  | hh | ih | iy | jh |
|----|----|----|----|----|----|----|----|----|----|----|----|----|----|----|----|----|----|----|----|----|
| aa | hi | hi | hi | hi | hi | hi | hi | lo | lo | lo | lo | hi | hi | hi | lo | lo | lo | hi | hi | lo |
| ae | hi | hi | hi | hi | hi | hi | hi | lo | lo | lo | lo | hi | hi | hi | lo | lo | lo | hi | hi | lo |
| ah | hi | hi | hi | hi | hi | hi | hi | lo | lo | lo | lo | hi | hi | hi | lo | lo | lo | hi | hi | lo |
| ao | hi | hi | hi | hi | hi | hi | hi | lo | lo | lo | lo | hi | hi | hi | lo | lo | lo | hi | hi | lo |
| aw | hi | hi | hi | hi | hi | hi | hi | lo | lo | lo | lo | hi | hi | hi | lo | lo | lo | hi | hi | lo |
| ax | hi | hi | hi | hi | hi | hi | hi | lo | lo | lo | lo | hi | hi | hi | lo | lo | lo | hi | hi | lo |
| ay | hi | hi | hi | hi | hi | hi | hi | lo | lo | lo | lo | hi | hi | hi | lo | lo | lo | hi | hi | lo |
| b  | lo | lo | lo | lo | lo | lo | lo | hi | lo | lo | lo | lo | lo | lo | lo | lo | lo | lo | lo | lo |
| ch | lo | lo | lo | lo | lo | lo | lo | lo | lo | lo | lo | lo | lo | lo | lo | lo | lo | lo | lo | hi |
| d  | lo | lo | lo | lo | lo | lo | lo | lo | lo | hi | hi | lo | lo | lo | lo | lo | lo | lo | lo | lo |
| dh | lo | lo | lo | lo | lo | lo | lo | lo | lo | hi | lo | lo | lo | lo | lo | lo | lo | lo | lo | lo |
| eh | hi | hi | hi | hi | hi | hi | hi | lo | lo | lo | lo | hi | hi | hi | lo | lo | lo | hi | hi | lo |
| er | hi | hi | hi | hi | hi | hi | hi | lo | lo | lo | lo | hi | hi | hi | lo | lo | lo | hi | hi | lo |
| ey | hi | hi | hi | hi | hi | hi | hi | lo | lo | lo | lo | hi | hi | hi | lo | lo | lo | hi | hi | lo |
| f  | lo | lo | lo | lo | lo | lo | lo | lo | lo | lo | lo | lo | lo | lo | hi | lo | lo | lo | lo | lo |
| g  | lo | lo | lo | lo | lo | lo | lo | lo | lo | lo | lo | lo | lo | lo | hi | hi | lo | lo | lo | lo |
| hh | lo | lo | lo | lo | lo | lo | lo | lo | lo | lo | lo | lo | lo | lo | lo | lo | lo | lo | lo | lo |
| ih | hi | hi | hi | hi | hi | hi | hi | lo | lo | lo | lo | hi | hi | hi | lo | lo | lo | hi | hi | lo |
| iy | hi | hi | hi | hi | hi | hi | hi | lo | lo | lo | lo | hi | hi | hi | lo | lo | lo | hi | hi | lo |
| jh | lo | lo | lo | lo | lo | lo | lo | lo | hi | lo | lo | lo | lo | lo | lo | lo | lo | lo | lo | lo |
| k  | lo | lo | lo | lo | lo | lo | lo | lo | lo | lo | lo | lo | lo | lo | lo | hi | lo | lo | lo | lo |
| l  | lo | lo | lo | lo | lo | lo | lo | lo | lo | lo | lo | lo | lo | lo | lo | lo | lo | lo | lo | lo |
| m  | lo | lo | lo | lo | lo | lo | lo | lo | lo | lo | lo | lo | lo | lo | lo | lo | lo | lo | lo | lo |
| n  | lo | lo | lo | lo | lo | lo | lo | lo | lo | lo | lo | lo | lo | lo | lo | lo | lo | lo | lo | lo |
| ng | lo | lo | lo | lo | lo | lo | lo | lo | lo | lo | lo | lo | lo | lo | hi | lo | lo | lo | lo | lo |
| ow | hi | hi | hi | hi | hi | hi | hi | lo | lo | lo | lo | hi | hi | hi | lo | lo | lo | hi | hi | lo |
| oy | hi | hi | hi | hi | hi | hi | hi | lo | lo | lo | lo | hi | hi | hi | lo | lo | lo | hi | hi | lo |
| p  | lo | lo | lo | lo | lo | lo | lo | hi | lo | lo | lo | lo | lo | lo | lo | lo | lo | lo | lo | lo |
| r  | lo | lo | lo | lo | lo | lo | lo | lo | lo | lo | lo | lo | lo | lo | lo | lo | lo | lo | lo | lo |
| s  | hi | hi | hi | hi | hi | hi | hi | hi | hi | hi | hi | hi | hi | hi | hi | hi | hi | hi | hi | hi |
| sh | hi | hi | hi | hi | hi | hi | hi | hi | hi | hi | hi | hi | hi | hi | hi | hi | hi | hi | hi | hi |
| t  | lo | lo | lo | lo | lo | lo | lo | lo | hi | lo | lo | lo | lo | lo | lo | lo | lo | lo | lo | lo |
| th | lo | lo | lo | lo | lo | lo | lo | lo | lo | hi | lo | lo | lo | lo | lo | lo | lo | lo | lo | lo |
| uh | hi | hi | hi | hi | hi | hi | hi | lo | lo | lo | lo | hi | hi | hi | lo | lo | lo | hi | hi | lo |
| uw | hi | hi | hi | hi | hi | hi | hi | lo | lo | lo | lo | hi | hi | hi | lo | lo | lo | hi | hi | lo |
| v  | lo | lo | lo | lo | lo | lo | lo | lo | lo | lo | lo | lo | lo | lo | hi | lo | lo | lo | lo | lo |
| w  | lo | lo | lo | lo | lo | lo | lo | lo | lo | lo | lo | lo | lo | lo | lo | lo | lo | lo | lo | lo |
| y  | hi | hi | hi | hi | hi | hi | hi | lo | lo | lo | lo | hi | hi | hi | lo | lo | lo | hi | hi | lo |
| z  | lo | lo | lo | lo | lo | lo | lo | lo | lo | lo | lo | lo | lo | lo | hi | lo | lo | lo | lo | lo |
| zh | lo | lo | lo | lo | lo | lo | lo | lo | lo | lo | lo | lo | lo | lo | lo | lo | lo | lo | lo | hi |
| +  | hi | hi | hi | hi | hi | hi | hi | hi | hi | hi | hi | hi | hi | hi | hi | hi | hi | hi | hi | hi |
| -  | hi | hi | hi | hi | hi | hi | hi | hi | hi | hi | hi | hi | hi | hi | hi | hi | hi | hi | hi | hi |

FROM FIG. 4A

| | k | l | m | n | ng | ow | oy | p | r | s | sh | t | th | uh | uw | v | w | y | z | zh | + | - |
|---|---|---|---|---|---|---|---|---|---|---|---|---|---|---|---|---|---|---|---|---|---|---|
| | lo | lo | lo | lo | lo | hi | hi | lo | lo | hi | hi | lo | lo | hi | hi | lo | lo | hi | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | lo | lo | hi | lo | hi | hi | lo | lo | lo | lo | lo | lo | lo | lo | lo | hi | hi |
| | lo | lo | lo | lo | lo | lo | lo | lo | lo | hi | hi | lo | lo | lo | lo | lo | lo | lo | lo | lo | hi | hi |
| | lo | lo | lo | lo | lo | lo | lo | lo | hi | hi | hi | hi | lo | lo | lo | lo | lo | lo | lo | lo | hi | hi |
| | lo | lo | lo | lo | lo | lo | lo | lo | hi | hi | hi | hi | lo | lo | lo | lo | lo | lo | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | lo | lo | lo | hi | hi | lo | lo | lo | lo | hi | lo | lo | hi | lo | lo | hi | hi |
| | hi | lo | lo | lo | hi | lo | lo | lo | lo | hi | hi | lo | lo | lo | lo | lo | lo | lo | lo | lo | hi | hi |
| | lo | lo | lo | lo | lo | lo | lo | lo | hi | hi | lo | lo | lo | lo | lo | lo | lo | lo | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | lo | lo | lo | hi | hi | lo | lo | lo | lo | lo | lo | lo | lo | lo | hi | hi | hi |
| | hi | lo | lo | lo | lo | lo | lo | lo | hi | hi | lo | lo | lo | lo | lo | lo | lo | lo | lo | lo | hi | hi |
| | lo | hi | lo | lo | lo | lo | lo | lo | hi | hi | lo | lo | lo | lo | lo | lo | lo | lo | lo | lo | hi | hi |
| | lo | lo | hi | hi | lo | lo | lo | lo | hi | hi | hi | lo | lo | lo | lo | lo | lo | lo | lo | lo | hi | hi |
| | lo | lo | hi | hi | hi | lo | lo | lo | hi | hi | lo | lo | lo | lo | lo | lo | lo | lo | lo | lo | hi | hi |
| | lo | lo | lo | hi | lo | lo | lo | lo | hi | hi | lo | lo | lo | lo | lo | lo | lo | lo | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | lo | hi | lo | hi | hi | lo | lo | lo | lo | lo | lo | lo | lo | lo | lo | hi | hi |
| | lo | hi | lo | lo | lo | lo | lo | hi | hi | hi | lo | lo | lo | lo | lo | lo | lo | lo | lo | lo | hi | hi |
| | hi | hi | hi | hi | hi | hi | hi | hi | hi | hi | hi | hi | hi | hi | hi | hi | hi | hi | hi | hi | hi | hi |
| | hi | hi | hi | hi | hi | hi | hi | hi | hi | hi | hi | hi | hi | hi | hi | hi | hi | hi | hi | hi | hi | hi |
| | lo | lo | lo | lo | lo | lo | lo | lo | hi | hi | hi | hi | lo | lo | lo | lo | lo | lo | lo | lo | hi | hi |
| | lo | lo | lo | lo | lo | lo | lo | lo | hi | hi | hi | lo | lo | lo | lo | lo | lo | lo | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | hi | hi | lo | lo | hi | hi | lo | lo | hi | hi | lo | lo | hi | lo | lo | hi | hi |
| | lo | lo | lo | lo | lo | lo | lo | lo | hi | hi | lo | lo | lo | hi | hi | lo | lo | hi | lo | lo | hi | hi |
| | lo | lo | lo | lo | lo | lo | lo | lo | hi | hi | lo | lo | lo | hi | hi | lo | lo | hi | lo | lo | hi | hi |
| | lo | lo | lo | lo | lo | hi | hi | lo | lo | hi | hi | lo | lo | hi | hi | lo | hi | lo | lo | lo | hi | hi |
| | lo | lo | lo | lo | lo | lo | lo | lo | hi | hi | lo | lo | lo | lo | lo | lo | lo | lo | hi | hi | hi | hi |
| | lo | lo | lo | lo | lo | lo | lo | lo | hi | hi | lo | lo | lo | lo | lo | lo | lo | hi | lo | hi | hi | hi |
| | hi | hi | hi | hi | hi | hi | hi | hi | hi | hi | hi | hi | hi | hi | hi | hi | hi | hi | hi | hi | hi | hi |
| | hi | hi | hi | hi | hi | hi | hi | hi | hi | hi | hi | hi | hi | hi | hi | hi | hi | hi | hi | hi | hi | hi |

FIG. 4B

McKesson Automation vs. McKessen Corporation

Phonetic Representation:
m, ax, k, eh, s, ax, n, -, ao, t, ax, m, ey, sh, ax, n
m, ax, k, eh, s, ax, n, k, ao, r, p, er, ey, sh, ax, n Match Matrix Based On Phonetic Confusability

|    | -   | -   | m    | ax   | k    | eh   | s    | ax   | n    | k    | ao   |
|----|-----|-----|------|------|------|------|------|------|------|------|------|
| -  |     | 0   | -20  | -40  | -60  | -80  | -100 | -120 | -140 | -160 |      |
| -  |     | -20 | 10   | -10  | -30  | -50  | -70  | -90  | -110 | -130 |      |
| m  |     | -40 | -10  | 20   | 0    | -20  | -40  | -60  | -80  | -100 |      |
| ax |     | -60 | -30  | 0    | 29   | 9    | -11  | -31  | -51  | -71  |      |
| k  |     | -80 | -50  | -20  | 9    | 39   | 19   | -1   | -21  | -41  |      |
| eh |     | -100| -70  | -40  | -11  | 19   | 48   | 28   | 8    | -12  |      |
| s  |     | -120| -90  | -60  | -31  | -1   | 28   | 58   | 38   | 18   |      |
| ax |     | -140| -110 | -80  | -51  | -21  | 8    | 38   | 67   | 47   |      |
| n  |     | -160| -130 | -100 | -71  | -41  | -12  | 18   | 47   | 77   |      |
| ao |     | -180| -150 | -120 | -91  | -61  | -32  | -2   | 27   | 57   |      |
| t  |     | -200| -170 | -140 | -111 | -81  | -52  | -22  | 7    | 37   |      |
| ax |     | -220| -190 | -160 | -131 | -101 | -72  | -42  | -13  | 17   |      |
| m  |     | -240| -210 | -180 | -151 | -121 | -92  | -62  | -33  | -3   |      |
| ey |     | -260| -230 | -200 | -171 | -141 | -112 | -82  | -53  | -23  |      |
| sh |     | -280| -250 | -220 | -191 | -161 | -132 | -102 | -73  | -43  |      |
| ax |     | -300| -270 | -240 | -211 | -181 | -152 | -122 | -93  | -63  |      |
| n  |     | -320| -290 | -260 | -231 | -201 | -172 | -142 | -113 | -83  |      |
| -  |     | -340| -310 | -280 | -250 | -221 | -191 | -162 | -132 | -103 |      |

Total Confusability (Lower Right Of Above Matrix) = 77

Aligned Strings
m   ax   k   eh   s   ax   n   -   ao   t
m   ax   k   eh   s   ax   n   k   ao   r

|  | r | p | er | ey | sh | ax | n | - | | |
|---|---|---|---|---|---|---|---|---|---|---|
| | -180 | -200 | -220 | -240 | -260 | -280 | -300 | -320 | -340 | -360 |
| | -150 | -170 | -190 | -210 | -230 | -250 | -270 | -290 | -310 | -330 |
| FROM FIG. 5A | -120 | -140 | -160 | -180 | -200 | -220 | -240 | -260 | -280 | -300 |
| | -91 | -111 | -131 | -151 | -171 | -191 | -211 | -231 | -251 | -270 |
| | -61 | -81 | -101 | -121 | -141 | -161 | -181 | -201 | -221 | -241 |
| | -32 | -52 | -72 | -92 | -112 | -132 | -152 | -172 | -192 | -211 |
| | -2 | -22 | -42 | -62 | -82 | -102 | -122 | -142 | -162 | -182 |
| | 27 | 7 | -13 | -33 | -53 | -73 | -93 | -113 | -133 | -152 |
| | 57 | 37 | 17 | -3 | -23 | -43 | -63 | -83 | -103 | -123 |
| | 67 | 66 | 46 | 26 | 6 | -14 | -34 | -54 | -74 | -93 |
| | 47 | 57 | 56 | 36 | 16 | -4 | -11 | -31 | -51 | -64 |
| | 27 | 56 | 47 | 46 | 45 | 25 | 5 | -2 | -22 | -41 |
| | 7 | 36 | 46 | 37 | 36 | 35 | 28 | 8 | 4 | -12 |
| | -13 | 16 | 26 | 36 | 46 | 45 | 38 | 37 | 17 | 14 |
| | -20 | -4 | 19 | 29 | 39 | 49 | 48 | 41 | 40 | 27 |
| | -40 | -11 | -1 | 9 | 38 | 48 | 52 | 57 | 37 | 50 |
| | -60 | -31 | -21 | -11 | 18 | 28 | 51 | 42 | 67 | 47 |
| | -73 | -50 | -21 | -11 | -1 | 28 | 38 | 61 | 52 | 77 |

METHOD, SYSTEM, AND COMPUTER READABLE MEDIUM FOR COMPARING PHONETIC SIMILARITY OF RETURN WORDS TO RESOLVE AMBIGUITIES DURING VOICE RECOGNITION

CROSS-REFERENCE TO RELATED APPLICATIONS

This application is a continuation from U.S. patent application Ser. No. 10/960,198, filed Oct. 6, 2004, entitled "METHOD, SYSTEM AND COMPUTER READABLE MEDIUM FOR COMPARING PHONETIC SIMILARITY OF RETURN WORDS TO RESOLVE AMBIGUITIES DURING VOICE RECOGNITION", which is incorporated by reference herein in its entirety.

FIELD OF THE INVENTION

Embodiments of the invention relate to a speech recognition system, and in particular to the selection of a return value based on a spoken input to the speech recognition system.

BACKGROUND

Speech recognition systems have been successfully deployed to implement voice browsers where a user utters a spoken input to the system and the system recognizes the spoken input by selecting a return value associated with the spoken input.

The selection of the return value is based on a correlation between a digitized waveform of the spoken input with a waveform of a word or string in a grammar provisioned in the system. Once the system selects the return value, the system presents the selected return value to the user for confirmation. For example, in a travel context, a voice recognition system may have the following dialogue or conversation with a user:

System: "Please state your destination city."
User: "Boston."
System: "I heard Boston, is that right?"
User: "Yes."

Since the user confirmed the return value of "Boston" in the above example, the system can continue the dialogue with the user.

If the user does not confirm the selected return value, then in one system known to the inventor, the system may simply repeat the dialogue or parts of it in the hope that the user may speak more clearly thereby to facilitate correct selection of the return value. The following conversation exemplifies this approach:

System: "Please state your destination city."
User: "Boston."
System: "I heard Austin, is that correct?"—A
User: "No, Boston."—B
System: "I heard Austin, is that correct?"—C In the above conversation, the parts labeled A, B, and C may be repeated until the user hangs up through sheer frustration or the system crashes.

In another system known to the inventor, in order to arrive at the correct return value, the system sequentially presents every possible return value provisioned in the system to the user for confirmation. With this approach, a sample conversation may take the following form:

System: "Please state your destination city."
User: "Boston."
System: "I heard Austin, is that correct?"
User: "No, Boston."
System: "I heard Portland, is that correct?"
User: "No, Boston."
System: "I heard Baltimore, is that correct?"
User: "No, Boston," etc.

As a list of destination cities may comprise hundreds of return values, each corresponding to a city on the list, it will be appreciated that the above technique for selecting the correct return value (also known as the N-best approach) is also inadequate.

BRIEF DESCRIPTION OF THE DRAWINGS

FIGS. 4A and B show an example of a consonant/vowel confusability matrix in accordance to one embodiment of the invention;

FIGS. 5A and B show an example of a matrix which is the output of a similarity comparison between strings, in accordance to one embodiment of the invention;

DETAILED DESCRIPTION

Embodiments of the invention disclose a technique and a system to select a correct return value corresponding to a spoken input in an efficient manner. If a user does not confirm an initial selection of a return value, then alternative return values related to the selected return value are presented to the user for selection. In one embodiment, each alternative return value is related to the selected return value in terms of a phonetic similarity between a string in a grammar for the selected return value and a string in a grammar for the alternative return value. The determination of the alternative return values is, advantageously performed, in one embodiment, at compile time rather than at run time, thus allowing presentation of the alternative return values to the user with little latency or delay. Other advantages of the techniques and systems of the present invention will be apparent from the description below.

As used herein, the term "dictionary" refers to data provisioned in a speech recognition system. For example, a dictionary may comprise a list of drugs, a list of corporations, a list of doctors, dentists, etc. In general, given a spoken input, the speech recognition system selects one entry from the dictionary. The selected entry is known as the return value. Further, as used herein, the term "grammar" refers to all anticipated spoken options/input provisioned in the speech recognition system and corresponding to a particular dictionary entry.

For purposes of this description reference will be made to FIG. 1 of the drawings, which shows a table 100 in which column 102 shows dictionary entries comprising corporations, and column 104 shows a grammar corresponding to each dictionary entry. As will be seen from the table 100, the dictionary entry for "A O N Corporation" includes the following grammar: "A O N Corporation, Aon C S G, Aon Corp, Aon Corporation, Aon Insurance, Auto Insurance Specialists, Rish Services." Another way of looking at the grammar is that it represents synonyms or aliases that a user may utter for a given dictionary entry.

Figure 1B:
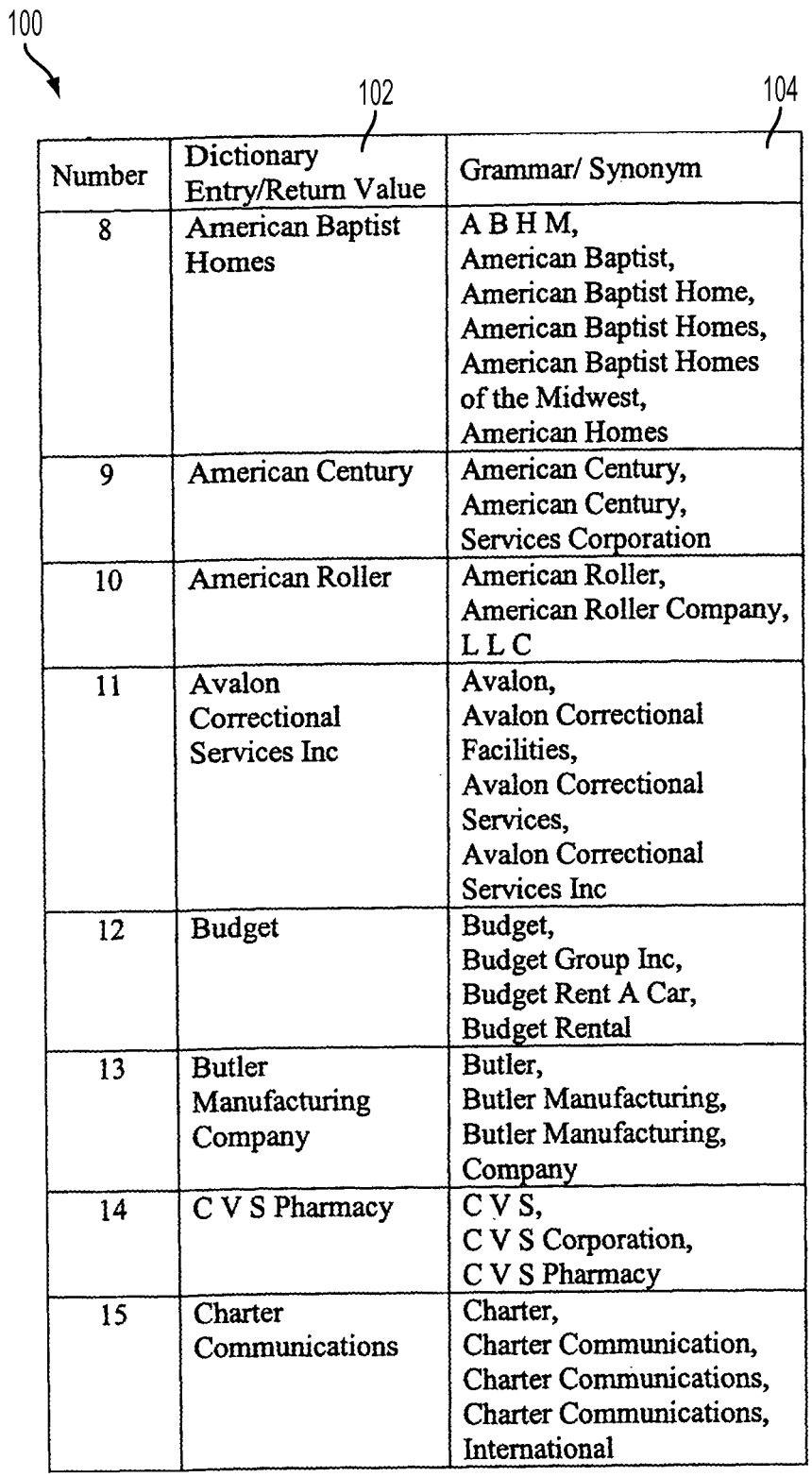
FIGS. 1-1I of the drawings show a table comprising a number of dictionary entries in accordance to one embodiment of the invention.
Figure 1D:
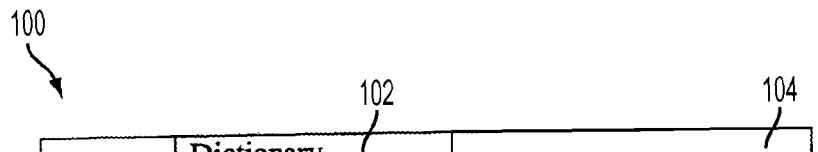
Figure 1F:
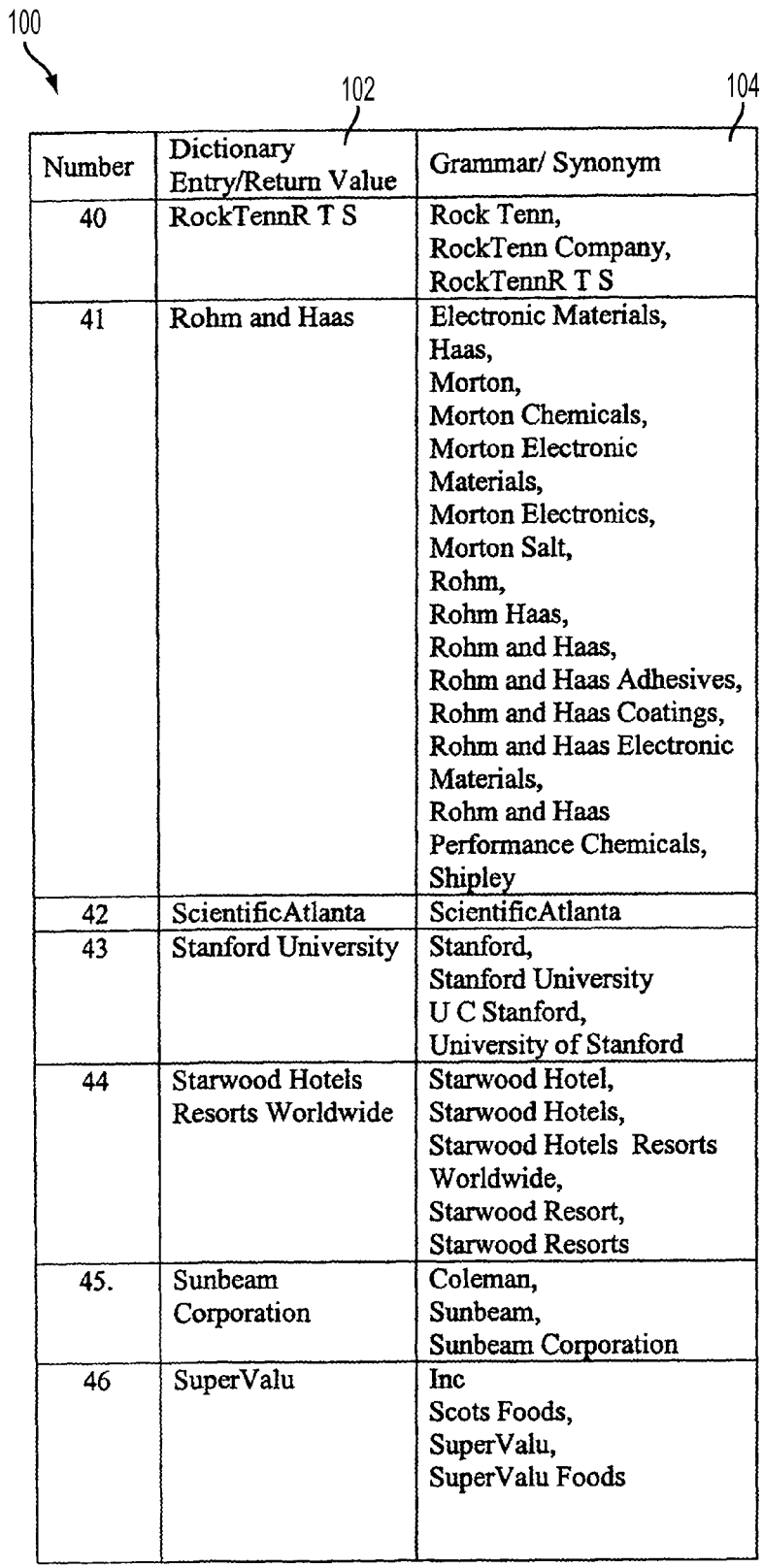
Figure 1G:
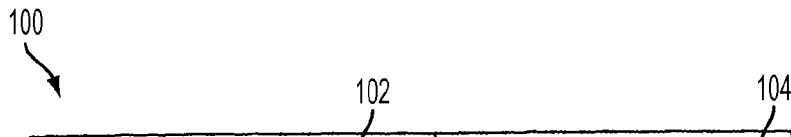
Figure 1H:
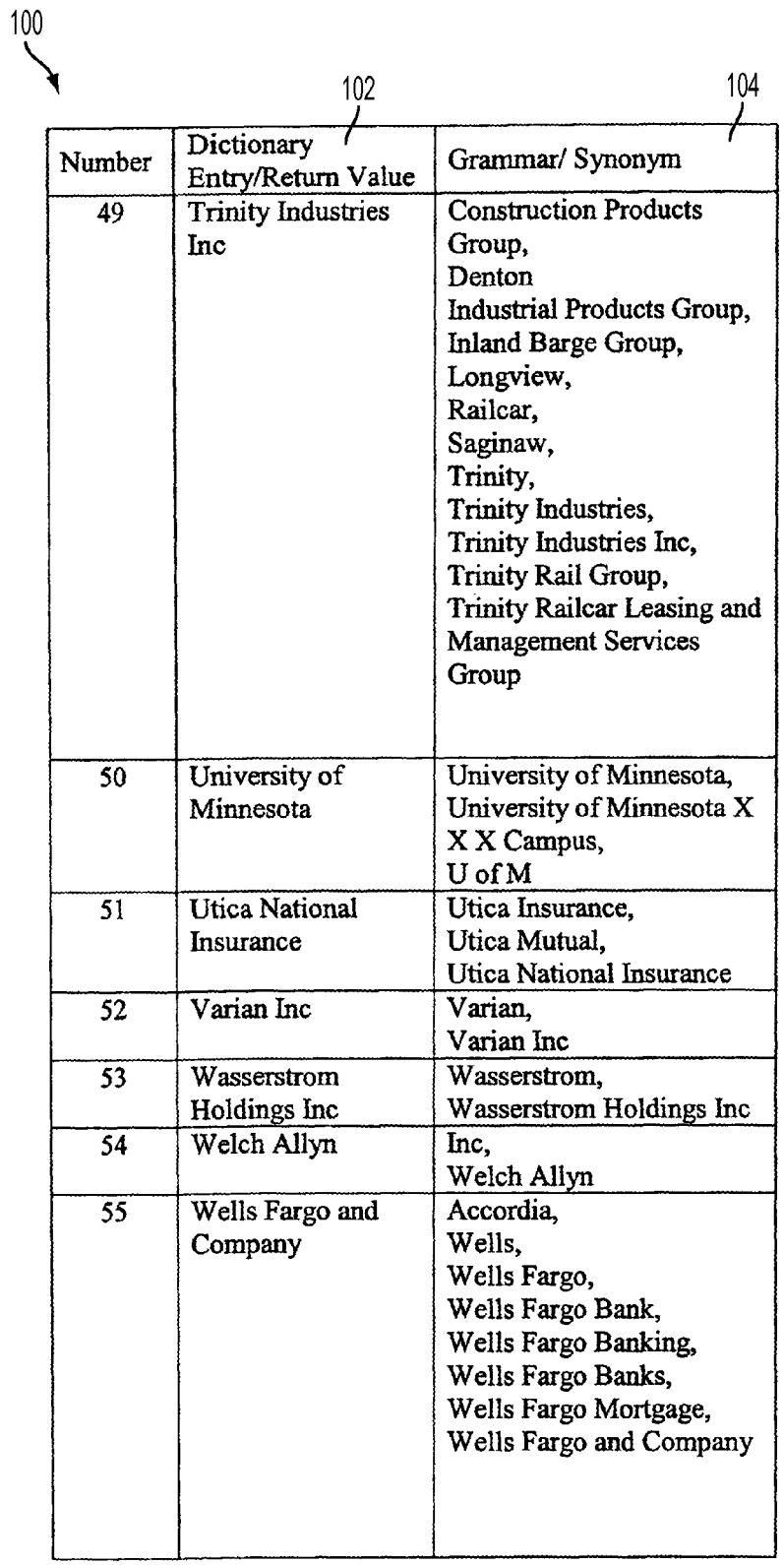
Figure 2:
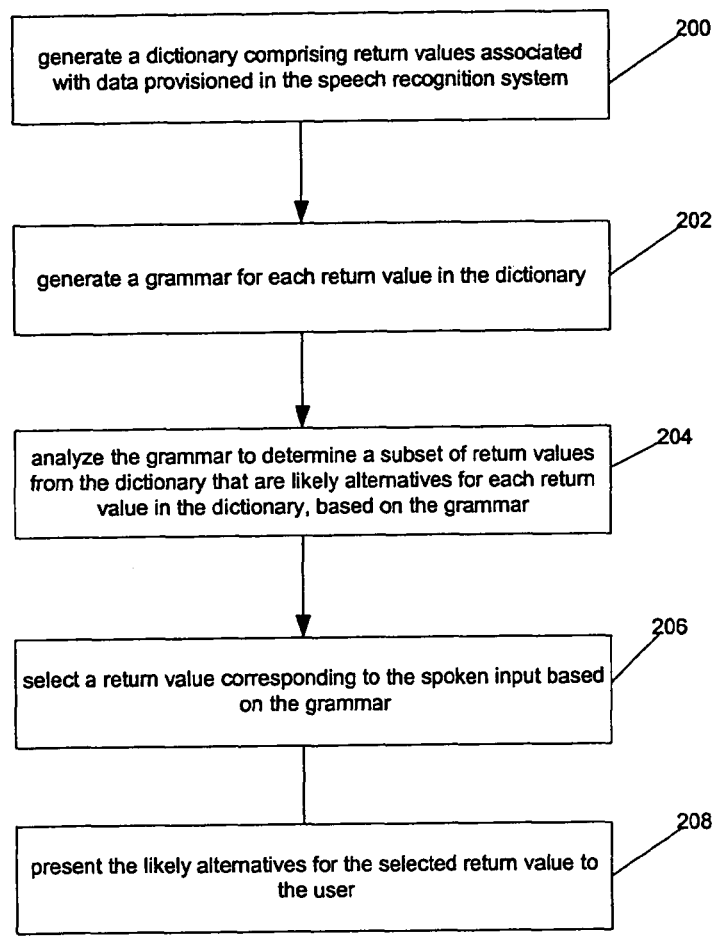
FIG. 2 of the drawings show a flowchart of operations performed by a speech recognition system in order to select a return value corresponding to an spoken input in accordance to one embodiment of the invention.
Figure 31:
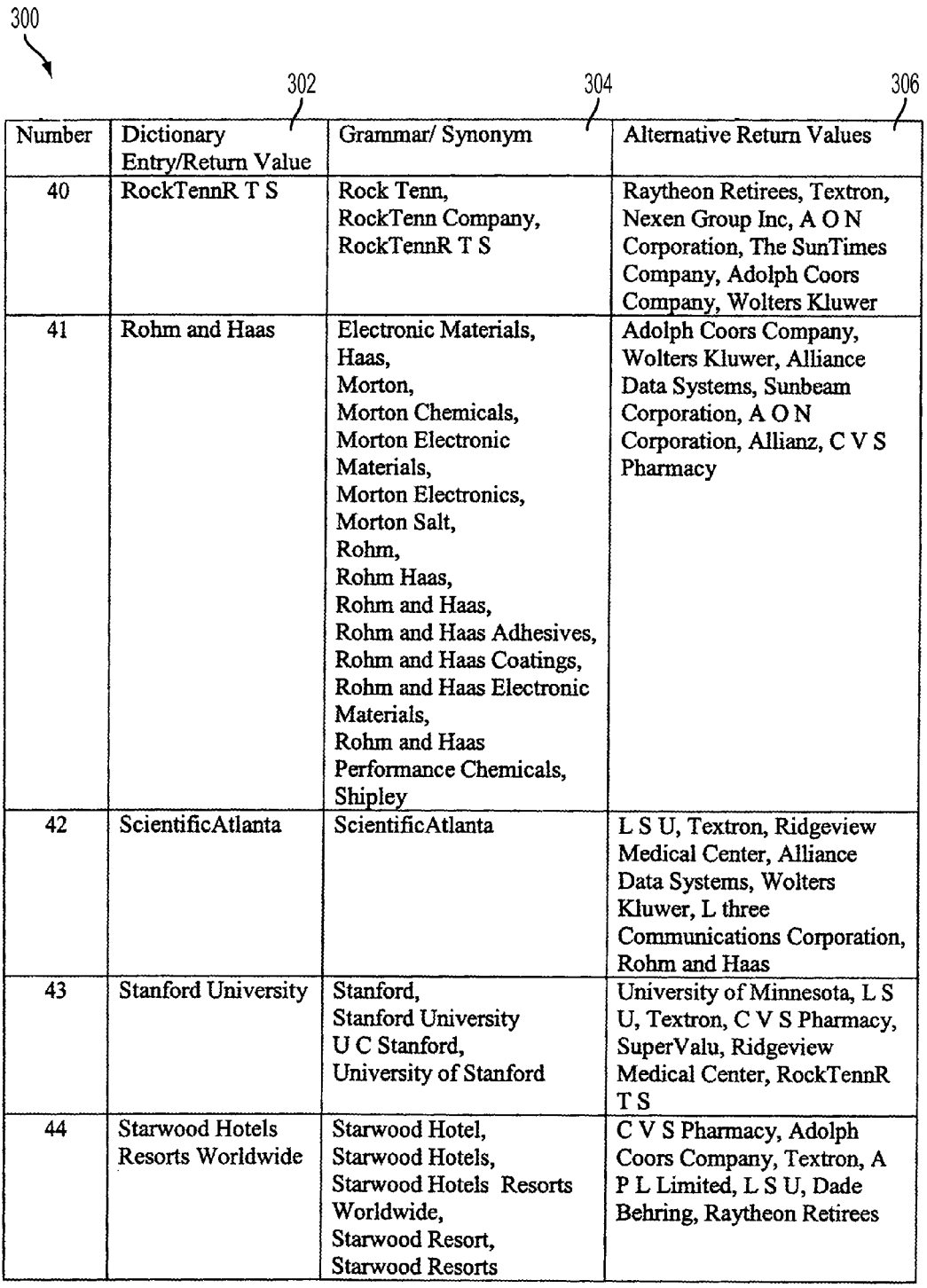

FIG. 2 of the drawings shows a flowchart of operations performed by a speech recognition system in order to select a return value corresponding to a spoken input, in accordance with one embodiment of the invention. Referring to FIG. 2, at block 200 a dictionary comprising return values associated with data provisioned in the speech recognition system is generated. In other words, at block 200, the values for the column 102, in table 100 of FIG. 1, are produced. In one embodiment, in order to generate the dictionary, a user is provided with a "make dictionary" menu item, which can be selected in order to bring up a "get file" dialogue box, for which is used to select a text file containing the dictionary items. Thus, a file containing the dictionary items may be imported into the system.

At block 202, the system generates a grammar for each return value in the dictionary. In other words, the values for the column 104 in table 100 of FIG. 1 are generated at block 202. Operations performed at block 202 may include receiving manual input of the grammar for each return value.

Figure 3K:
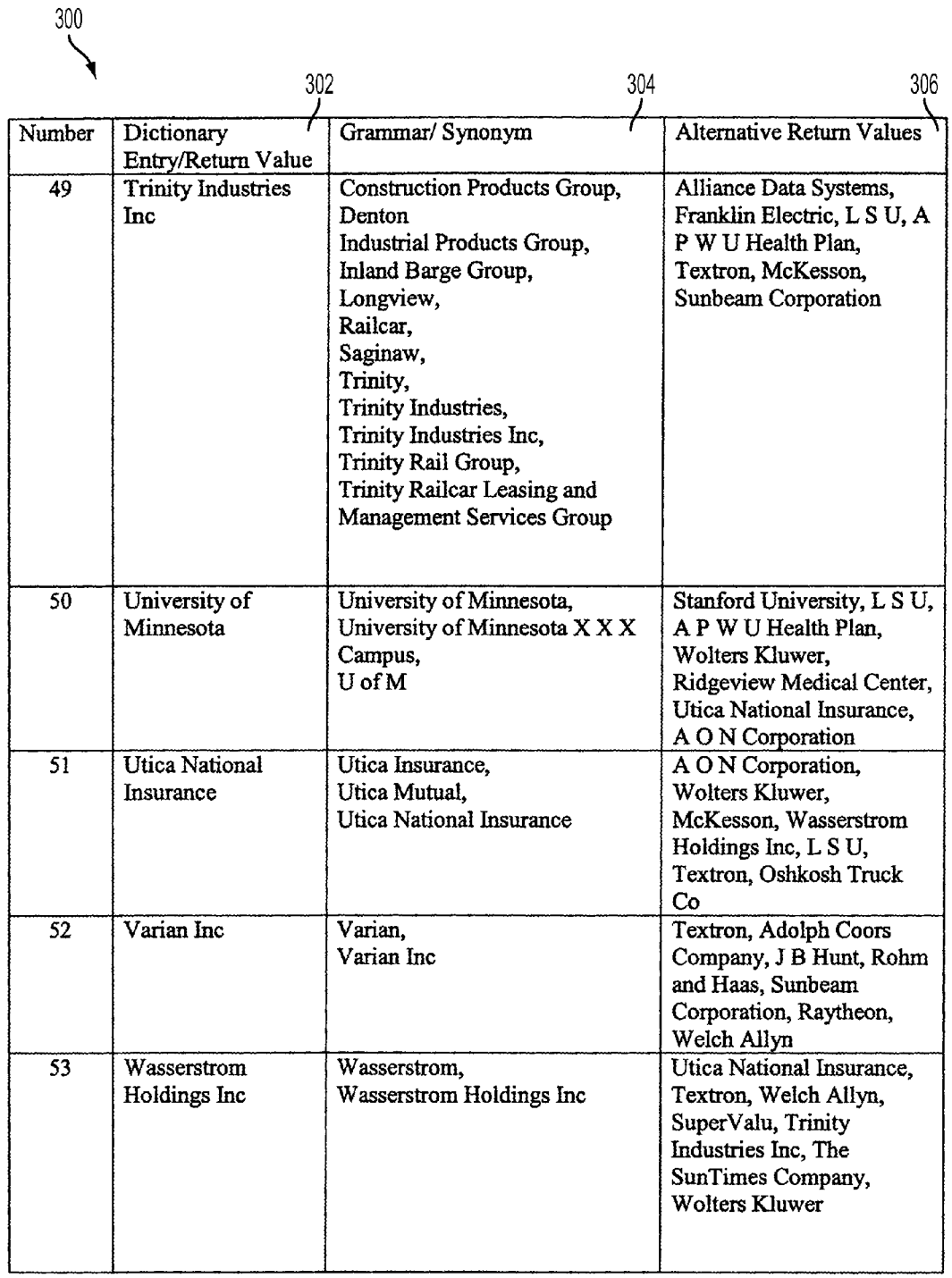
FIGS. 3-3M show the table of FIG. 1 updated to include a column of alternative returns values generated in accordance with one embodiment of the invention.
Figure 3M:
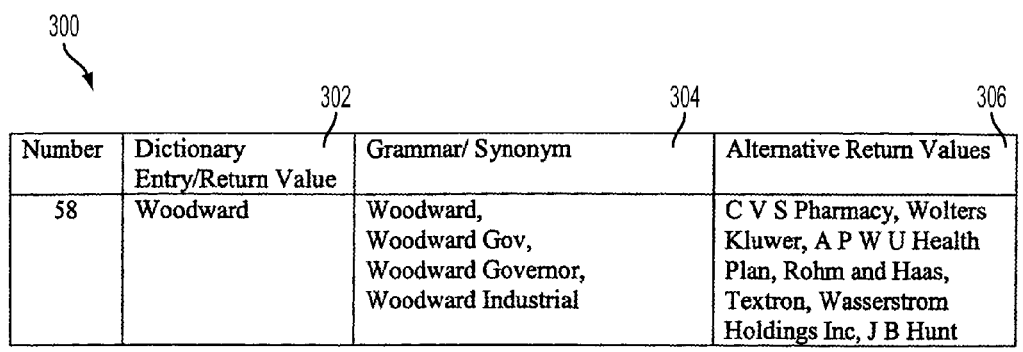

The output of the operations performed at block 200, and block 202 is a table such as the table 100 of FIG. 1 of the drawings. Once the table is generated, the next step is for the system to analyze the grammar at block 204 to determine a subset of return values from the dictionary that are likely alternatives for each return value in the dictionary based on the grammar. In one embodiment, the output of the operations performed at block 204 is to generate a table 300 which has three columns, namely column 302, 304, and 306, as can be seen from FIG. 3 of the drawings. Columns 302 and 304 correspond to columns 102, and 104, respectively of table 100 of FIG. 1. The column 306 contains the alternative return values generated by analyzing the grammar step 204. In one embodiment, the subset of return values is generated by comparing pairs of strings from the grammar corresponding to the dictionary entries in order to determine the phonetic similarity between the strings. In one embodiment, each string in a given pair is from the grammar for a different dictionary entry. For example, in one embodiment the operations at block 204 may include performing the following algorithm:

for each dictionary entry;
        for each string in the grammar for the dictionary entry;
            compare the string with every other string in the dictionary that is not in the grammar for the dictionary entry.

Thus for example, each string in the grammar for the first dictionary entry "AON Corporation" would be compared to every other string in table 300 that is not a string in the grammar for "AON Corporation".

In order to perform the comparison of the strings, the strings are first phoneticized or converted into their phonetic equivalents. In one embodiment this is done by utilizing algorithms utilized by text to speech systems. These systems use a combination of built-in dictionaries and inferences based on generalizing from the pronunciation dictionaries to convert a word to its spoken syllable/phonetic structure. In one embodiment an alternative for a return value is characterized as likely if it passes a similarity threshold. In order to determine how similar strings are, in one embodiment, the system is provisioned with a consonant/vowel confusability matrix which provides an indication of how likely a particular vowel or consonant is likely to be confused with another vowel or consonant. FIGS. 4A and B of the drawings shows one example of a consonant/vowel confusability matrix 400. Referring to FIGS. 4A and B, it will be seen that the vowel sound "ae" and the vowel sound "ay" have a high probability of being confused, whereas the vowel sound "oy" has a low probability of being confused with the consonant "k". Each value in the matrix shown in FIGS. 4A and B of the drawings is computed based on linguistic research on how sounds are produced. For example this research indicates that B and P, which are known as bilabials are produced using the lips and, thus have a high degree of being confused. In one embodiment, each cell in the matrix of FIGS. 4A and B is a result of a "fitness function" which determines how closely aligned the two sounds are. In one embodiment, the fitness function uses the following assumptions:

(f) Vowels are highly fluid and are considered similar for all long and short vowels;
(g) Dropped/missing characters decrease the value of the fitness function;
(h) S characters, which are equivalent to a decrease in the fitness function;
(i) Similar sounding characters such as B/P (bilabial fricatives), S/F/V (labial—dental fricatives), TH/T/D, etc. are considered to be a match;
(j) Characters that match early in a word are favored over ones that match later in the word.

Once the strings are phoneticized, they need to be compared to one another to see if they are similar. In one embodiment an alternative for a return value is characterized as likely if it passes a similarity threshold. In order to determine how similar strings are, in one embodiment, the system is provisioned with a consonant/vowel confusability matrix which provides an indication of how likely a particular vowel or consonant is likely to be confused with another vowel or consonant. Another source of determining values for each cell in the matrix of FIGS. 4A and B takes into account how speech engines recognize sounds. For example, it is known that the S sound has low energy and would produce a match with other sounds.

In one embodiment, the comparison step at block 204 uses the consonant/vowel confusability matrix and a dynamic programming algorithm to compute a confusability number, which provides an indication of how confusable two strings are. In one embodiment, the dynamic programming algorithm may be the Smith-Waterman/Needleman-Wunsch algorithm or a derivative thereof. FIGS. 5A and B of the drawings shows a matrix 500, which is the output of a similarity comparison between the strings "McKesson Automation" and "McKesson Corporation". The confusability number, which is at the lower right hand corner of the matrix, is equal to 77. If the confusability number is above a certain empirically determined threshold, for example say 50, then this indicates that the strings are highly confusable, whereas if the confusability number is low, say below 30, then this indicates that the confusability or degree of similarity between the strings is low.

In accordance with the techniques disclosed herein, if the confusability number is high for a given pair of strings, wherein a first string in the pair of strings is from the grammar for a first return value, and the second string in the pair of strings is from the grammar for a second return value and is not in the grammar for the first return value, then the second string is selected as a likely alternative for the first return value. Thus, a subset of return values comprising likely alternatives for each return value in the dictionary is constructed.

As noted above, column 306 of table 300 of FIG. 3 shows the alternative return values corresponding to each dictionary entry. Looking more closely at table 300, it will be seen that the string "American Roller" is in the list of alternative return values corresponding to the dictionary entry "American Century", and that the string "American Century" is in the list of alternative return values for the dictionary entry "American Roller". This is because a phonetic similarity comparison between the strings "American Century" and "American Roller" in accordance with the techniques disclosed herein has a high confusability number.

In one embodiment, in addition to identifying possible alternative return values based on a phonetic similarity threshold, possible alternative return values are also identified based on synonym relationships. For example, looking at the fifth dictionary entry in table 300, it will be seen that one synonym for "Alliance Data Systems" is the word "Alliance". By looking at the grammar for the dictionary entry "Textron", we note that the word "Alliance" is a synonym or alias for the dictionary entry "Textron". Since, "Alliance" is a synonym for "Textron", it is reasonable to assume that a caller/user may say "Alliance" in order to refer to "Textron". Thus, because of this synonym relationship, the word "Textron" is added into the list of alternative return values for the dictionary entry "Alliance Data Systems".

Referring again to FIG. 2 of the drawings, at block 206, the system selects a return value corresponding to the spoken input based on the grammar. The operations at block 206 are performed by a speech recognition engine of the system.

At block 208, if the selected return value is not confirmed by a user, then the system presents the likely alternatives for the selected return values to the user. For example in one embodiment in response to a spoken input, the system may select the return value "Adolph Coors Company". This return value is presented to the user for confirmation. For example, the system may say "Do you mean Adolph Coors Company?". In response, the user may say yes, and the dialogue may continue. However, if the system incorrectly selected the return value based on the spoken input, then the user will not confirm the selected return value, in which case the system will present the alternative return values to the user, for selection by the user. In this case, the alternative return values include "Rohm and Haas", "The Sunday Times Company", "Wells Fargo and Company", "Textron", "JB Hunt", "American Roller", "Starwood Hotel Resorts Worldwide". The alternative return values are presented to the user in accordance with a predefined dialogue strategy. In one example, the dialogue strategy may include presenting all possible choices for the alternative return values to the user, at once. For example, the system may say:

"Okay, choices are 1. Rohm and Haas, 2. The Sunday Times Company, 3. Wells Fargo and Company, 4. Textron, 5. JB Hunt, 6. American Roller, 7. Starwood Hotels Resorts Worldwide."

It will be seen that the above technique is an improvement over the N-Best technique of the prior art. For example, in the N-Best technique, the system will sequentially present every other dictionary entry besides the dictionary entry "Adolph Coors Company" to the user for selection, which is extremely annoying to the user.

Figure 6:
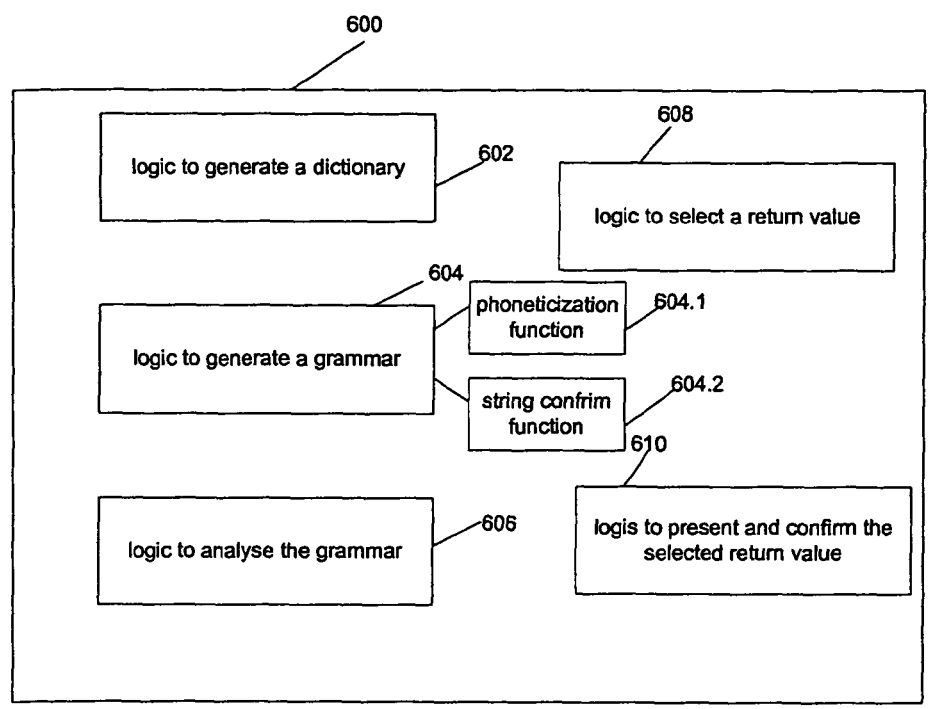
FIG. 6 shows a high-level block diagram of a speech recognition system in accordance to one embodiment of the invention.

Referring now to FIG. 6 of the drawings, there is shown a high-level block diagram of a speech recognition system 600 that may be used to implement the above techniques described with reference to FIG. 2 of the drawings. As will be seen, the system 600 includes logic to generate a dictionary 602, logic to generate a grammar 604, logic to analyze the grammar 606, logic to select the return value 608, and logic to present and confirm the selected return value, and the alternative return values. The logic to analyze the grammar 606 may include a phoneticization function 206.1, and a string compare function 206.2 as described.

Figure 7:
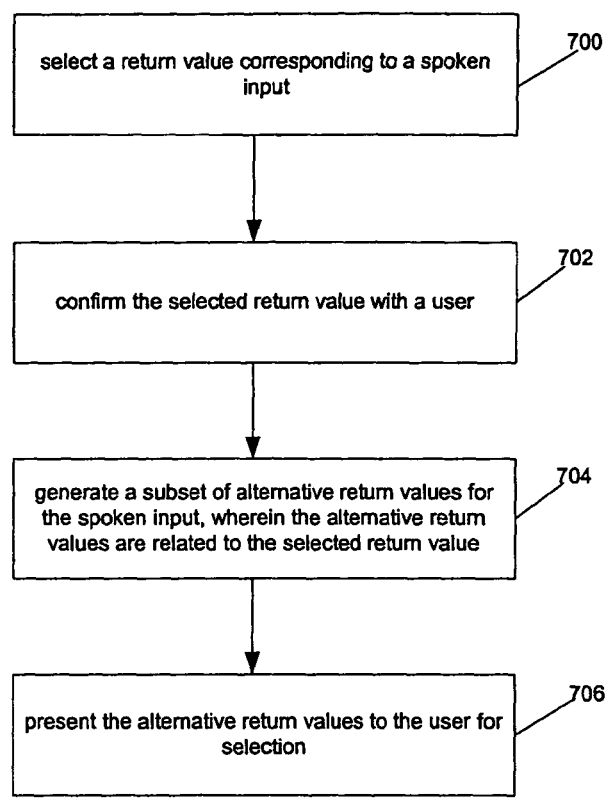
FIG. 7 shows a flowchart of operations performed by a speech recognition system, in accordance to one embodiment of the invention.

Referring now to FIG. 7 of the drawings, there is shown a flow chart of operations performed by a speech recognition system, in accordance with another embodiment of the invention. Starting at block 700, the system selects a return value corresponding to a spoken input. This operation is performed using a speech recognition engine provisioned in the system. At block 702, the system confirms the selected return value with a user. The particular operations involved with regard to block 702 include entering a dialogue/conversation with a user in order to get confirmation that the selected return value is correct.

At block 704, the system generates a subset of alternative return values for the spoken input. The alternative return values are related to the selected return value in terms of a phonetic closeness threshold, or in terms of a synonym relationship, as described above.

At block 706, the system presents the alternative return values to the user for selection, as described above.

Figure 8:
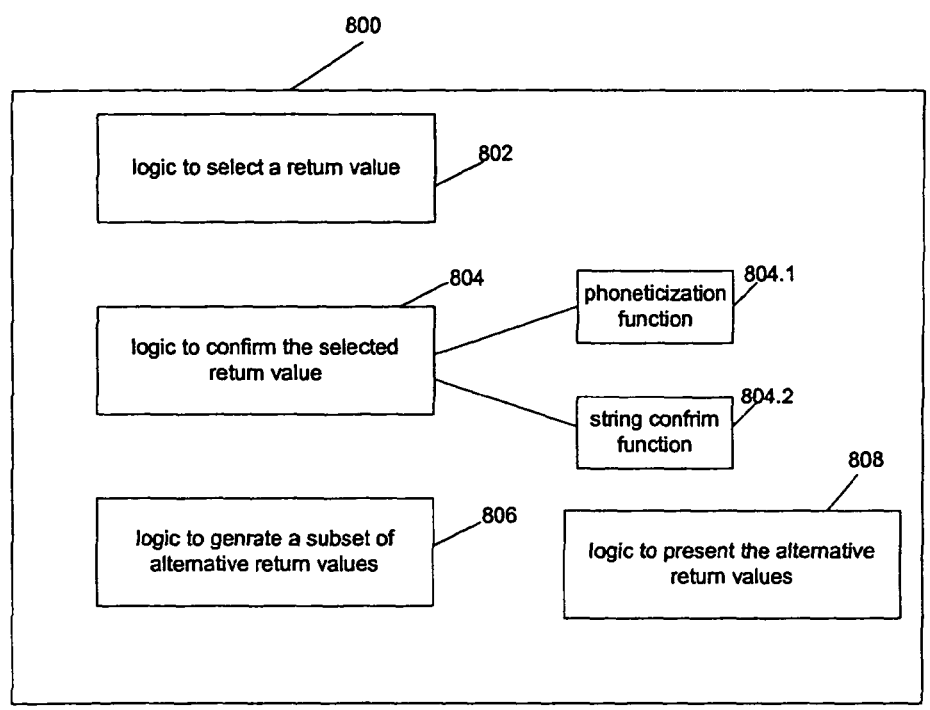
FIG. 8 shows a high-level functional block diagram of a speech recognition system used to perform the operations shown in FIG. 7, in accordance to one embodiment of the invention.

Referring now to FIG. 8 of the drawings, there is shown a high-level functional block diagram of a speech recognition system 800 that are used to implement the technique described with reference to FIG. 7. As will be seen, the system 800 includes logic 802 to select a return value, logic 804 to confirm the selected return value, logic 806 to generate a subset of alternative return values, and logic 808 to present the alternative return values. The logic 806 to generate the subset of alternative return values may include a phoneticization function 806.1, and a spring compare function 806.2, as described.

In one embodiment, the generation of the alternative return values is performed at compile time as opposed to at run time. This reduces latencies or delays in presenting the alternative return values to the user for selection.

In one embodiment, the strings in a grammar corresponding to words in a dictionary are analyzed based on the above-described techniques to identify strings that have a high likelihood of being confused or misrecognized. A user is notified of the strings that have a high likelihood of being confused so that the user can make changes to the grammar. This embodiment makes it possible to fine tune a grammar to minimize the occurrence of strings that could cause the system to misrecognize the strings.

Figure 9:
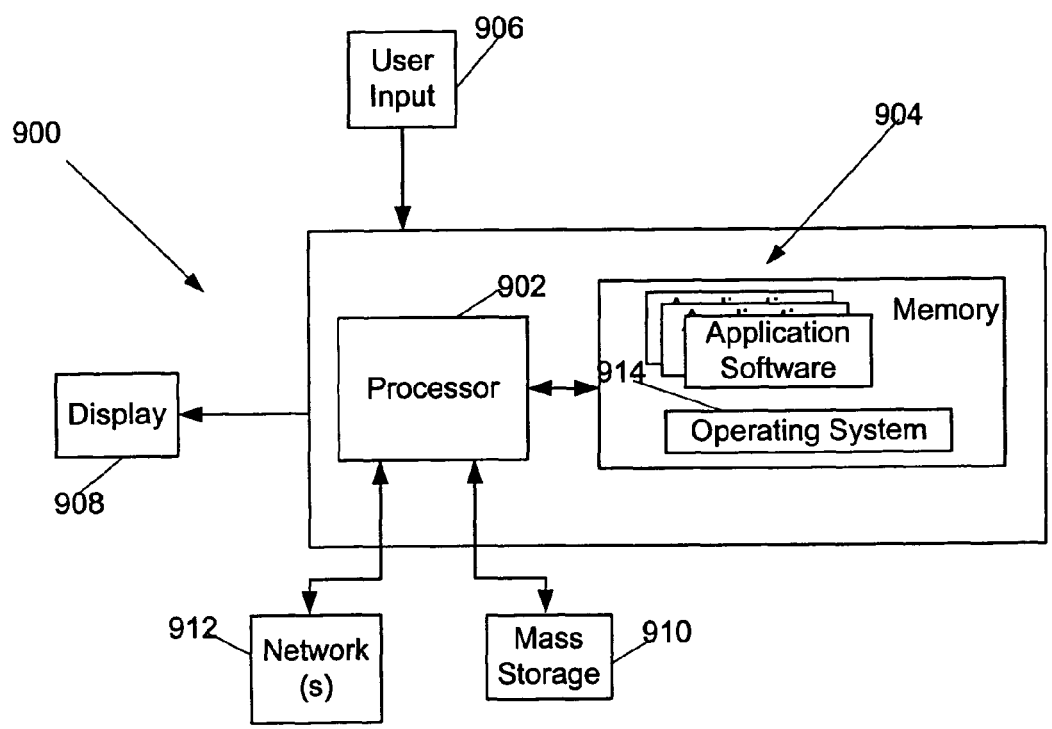
FIG. 9 shows a high-level block diagram of hardware that may be used to implement the speech recognition systems of the present invention.

Referring to FIG. 9 of the drawings, reference numeral 900 generally indicates hardware that may be used to implement embodiments of the speech recognition system of the present invention. The hardware 900 typically includes at least one processor 902 coupled to a memory 904. The processor 902 may represent one or more processors (e.g., microprocessors), and the memory 904 may represent random access memory (RAM) devices comprising a main storage of the hardware 900, as well as any supplemental levels of memory e.g., cache memories, non-volatile or back-up memories (e.g. programmable or flash memories), read-only memories, etc. In addition, the memory 904 may be considered to include memory storage physically located elsewhere in the hardware 900, e.g. any cache memory in the processor 902, as well as any storage capacity used as a virtual memory, e.g., as stored on a mass storage device 910.

The hardware 900 also typically receives a number of inputs and outputs for communicating information externally. For interface with a user or operator, the hardware 900 may include one or more user input devices 906 (e.g., a keyboard, a mouse, etc.) and a display 908 (e.g., a Cathode Ray Tube (CRT) monitor, a Liquid Crystal Display (LCD) panel).

For additional storage, the hardware 900 may also include one or more mass storage devices 910, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 400 may include an interface with one or more networks 912 (e.g., a local area network (LAN), a wide area network (WAN), a wireless network, and/or the Internet among others) to permit the communication of information with other computers coupled to the networks. It should be appreciated that the hardware 900 typically includes suitable analog and/or digital interfaces between the processor 902 and each of the components 904, 906, 908 and 912 as is well known in the art.

The hardware 900 operates under the control of an operating system 914, and executes various computer software applications 916, components, programs, objects, modules, etc. (e.g. a program or module which performs operations described above). Moreover, various applications, components, programs, objects, etc. may also execute on one or more processors in another computer coupled to the hardware 900 via a network 912, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modifications and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
generating a dictionary comprising return values;
generating a grammar for each return value in the dictionary;
for each return value in the dictionary, analyzing the grammar to determine a subset of return values from the dictionary that are likely alternatives for the return value, comprising for each string in the grammar for the return value, comparing each string with every other string in the dictionary that is not in the grammar for that return value;
when a first string in a pair of strings is from the grammar for a first return value, and a second string in the pair of strings is from the grammar for a second return value and is not in the grammar for the first return value, then selecting the second string as a likely alternative for the first return value, and constructing the subset of return values that are likely alternatives for each return value in the dictionary;
if said comparison indicates that the strings are related based on one of a phonetic similarity threshold and a synonym relationship then adding the return value associated with the other string to the subset; and
if the return value is not confirmed by a user, then presenting the return values in the subset for the return value to the user for selection, wherein the user is notified of each string that have a likelihood of being confused so that the user can make changes to the grammar.

2. The method of claim 1 comprising selecting the first return value corresponding to a spoken input based on the grammar.

3. The method of claim 1 comprising selecting a first return value based on the grammar.

4. The method of claim 1, wherein comparing each string uses a dynamic programming algorithm.

5. The method of claim 4, wherein the dynamic programming algorithm is based on the Smith-Waterman/Needleman-Wunsch algorithm.

6. The method of claim 1, wherein the return values are associated with data provisioned in a speech recognition system.

7. The method of claim 1, wherein the generating steps are performed at compile time as opposed to at runtime.

8. A system, comprising:
a memory configured to store logic instructions; and
a processor configured to execute the logic instructions that when executed cause the logic instructions to:
select a return value corresponding to a spoken input;
generate a subset of alternative return values for the spoken input, wherein each alternative return value is related to the selected return value based on one of a synonym relationship and a phonetic similarity threshold between a grammar for the return value and the alternative return value;
generate a first string in a pair of strings is from the grammar for a first return value, and a second string in the pair of strings is from the grammar for a second return value and is not in the grammar for the first return value, then selecting the second string as a likely alternative for the first return value, and constructing the subset of return values that are likely alternatives for each return value in a dictionary; and
present the alternative return values to a user for selection, wherein the user is notified of each string that has a likelihood of being confused.

9. The system of claim 8 wherein the logic instructions confirm the selected return value with the user.

10. The system of claim 8, wherein the user can make changes to the grammar when each string has a likelihood of being confused.

11. The system of claim 8, wherein the phonetic similarity threshold is calculated by comparing a phonetic representation of strings in the grammars for the return value and the alternative return value.

12. The system of claim 11, wherein the phonetic similarity threshold is calculated using a dynamic programming algorithm.

13. The system of claim 12, wherein the dynamic programming algorithm is based on the Smith-Waterman/Needleman-Wunsch algorithm.

14. The system of claim 8, wherein the logic to generate the subset of alternative return values generates the return values at compile time as opposed to at runtime.

15. The system of claim 8, further comprising logic to generate a grammar for each return value provisioned in the system.

16. A non-transitory computer-readable medium, having stored thereon a sequence of instructions, which when executed by a computer processor, cause the computer processor to perform:
  generating a dictionary comprising return values;
  generating a grammar for each return value in the dictionary;
  for each return value in the dictionary, analyzing the grammar to determine a subset of return values from the dictionary that are likely alternatives for the return value comprising for each string in the grammar for the return value, comparing each string with every other string in the dictionary that is not in the grammar for that return value and if said comparison indicates that the strings are related based on one of a phonetic similarity threshold and a synonym relationship then adding the return value associated with the other string to the subset;
  when a first string in a pair of strings is from the grammar for a first return value, and a second string in the pair of strings is from the grammar for a second return value and is not in the grammar for the first return value, then selecting the second string as a likely alternative for the first return value, and constructing the subset of return values that are likely alternatives for each return value in the dictionary; and
  if the return value is not confirmed by a user, then presenting the return values in the subset for the first return value at once to the user for selection, wherein the user is notified of each string that has a likelihood of being confused so that the user can make changes to the grammar.

17. A system, comprising:
a processor; and
a memory coupled to the processor, the memory storing instructions which when executed by the processor, cause the computer processor to perform:
  generating a dictionary comprising return values,
  generating a grammar for each return value in the dictionary;
  for each return value in the dictionary, analyzing the grammar to determine a subset of return values from the dictionary that are likely alternatives for the return value, comprising for each string in the grammar for the return value, comparing each string with every other string in the dictionary that is not in the grammar for that return value and if said comparison indicates that the strings are related based on one of a phonetic similarity threshold and a synonym relationship then adding the return value associated with the other string to the subset,
  when a first string in a pair of strings is from the grammar for a first return value, and a second string in the pair of strings is from the grammar for a second return value and is not in the grammar for the first return value, then selecting the second string as a likely alternative for the first return value, and constructing the subset of return values that are likely alternatives for each return value in the dictionary, and
  if the return value is not confirmed by a user, then presenting the return values in the subset for the first return value at once to the user for selection, wherein the user is notified of each string that has a high likelihood of being confused so that the user can make changes to the grammar.

18. A non-transitory computer-readable storage medium, having stored thereon, a sequence of instructions which when executed by a computer processor, cause the computer processor to perform:
  selecting a return value corresponding to a spoken input;
  generating a subset of alternative return values for the spoken input, wherein the alternative return value is related to the selected return value based on one of a synonym relationship and a phonetic similarity threshold return value based on one of a synonym relationship and a phonetic similarity threshold between the grammars for the return value and the alternative return value;
  generating a first string in a pair of strings is from the grammar for a first return value, and a second string in the pair of strings is from the grammar for a second return value and is not in the grammar for the first return value, then selecting the second string as a likely alternative for the first return value, and constructing the subset of return values that are likely alternatives for each return value in a dictionary; and
  presenting the alternative return values to the user for selection, wherein the user is notified of a each string that has a likelihood of being confused so that the user can make changes to the grammar.

19. A method, comprising:
selecting a return value corresponding to a spoken input;
generating a subset of alternative return values for the spoken input, wherein the alternative return value is related to the selected return value based on one of a synonym relationship and a phonetic similarity threshold between the grammars for the return value and the alternative return value;
generating a first string in a pair of strings is from the grammar for a first return value, and a second string in the pair of strings is from the grammar for a second return value and is not in the grammar for the first return value, then selecting the second string as a likely alternative for the first return value, and constructing the subset of return values that are likely alternatives for each return value in a dictionary; and
presenting the alternative return values to the user for selection, wherein the user is notified of each string that has a likelihood of being confused so that the user can make changes to the grammar.

20. The method of claim 19, wherein the step of generating the subset of alternative return values is performed at compile time as opposed to at runtime.

* * * * *